(12) United States Patent
Bernal

(10) Patent No.: US 10,380,872 B2
(45) Date of Patent: Aug. 13, 2019

(54) CATEGORIZING COMPLIANCE WITH SECURITY PROTOCOLS

(71) Applicant: Golden Security Services US Inc., Hallandale, FL (US)

(72) Inventor: Juan Pablo Bernal, Hallandale, FL (US)

(73) Assignee: Golden Security Services US Inc., Hallandale, FL (US)

(*) Notice: Subject to any disclaimer, the term of this patent is extended or adjusted under 35 U.S.C. 154(b) by 0 days.

(21) Appl. No.: 16/073,915

(22) PCT Filed: Feb. 6, 2017

(86) PCT No.: PCT/IB2017/000979
§ 371 (c)(1),
(2) Date: Jul. 30, 2018

(87) PCT Pub. No.: WO2017/136811
PCT Pub. Date: Aug. 10, 2017

(65) Prior Publication Data
US 2019/0043339 A1  Feb. 7, 2019

Related U.S. Application Data

(60) Provisional application No. 62/291,735, filed on Feb. 5, 2016.

(51) Int. Cl.
*G08B 25/00* (2006.01)
*G08B 29/18* (2006.01)

(52) U.S. Cl.
CPC .......... *G08B 25/008* (2013.01); *G08B 29/18* (2013.01)

(58) Field of Classification Search
CPC ... G08B 25/008; G08B 29/18; H04L 63/1408; H04L 63/1416; H04L 63/1433; H04L 63/20; G16H 10/60
See application file for complete search history.

(56) References Cited

U.S. PATENT DOCUMENTS

| 3,435,444 A | 3/1969 | Kuhn |
| 2012/0216243 A1 | 8/2012 | Gill et al. |
| 2013/0307682 A1 | 11/2013 | Jerhotova et al. |
| 2014/0222521 A1 | 8/2014 | Chait |

OTHER PUBLICATIONS

International Search Report and Written Opinion for PCT/US17/016671, filed Feb. 6, 2017.
International Search Report and Written Opinion for PCT/IB17/000979, filed Feb. 6, 2017.
International Preliminary Report Written Opinion for PCT/IB17/000979, dated Aug. 7, 2018.

*Primary Examiner* — Orlando Bousono
(74) *Attorney, Agent, or Firm* — Fleit Gibbons Gutman Bongini & Bianco PL; Paul D. Bianco; Gary S. Winer

(57) ABSTRACT

To improve or ensure a standard of compliance with critical security protocols, performance is quantified by communicating data from an alarm system, access system, security task log, as well as training information, to a server. This data is combined and analyzed using a processor of the server to visually present the analyzed data as numerical values corresponding to each type of data, where the values representing a security risk for each type of data. A single combined numerical value corresponding to a combination of the numerical values for each type of data is presented, along with graphical objects using shapes and colors which represent the numerical values and the single combined numerical value.

11 Claims, 13 Drawing Sheets

| Radiation + Accesses | Radiation Register | Alarm Systems | Access System | Maintenance Reports |

Selected Date Range:
2015/08/01 - 2015/09/09. EDIT
PDF Report
[Download]
Event Details

| Date | User | Event |
|---|---|---|
| 2015-08-31 16:25:40.000 | | Closure Per User |
| 2015-09-01 16:22:32.000 | | Opening Per User |
| 2015-09-01 16:43:20.000 | | Opening Per User |
| 2015-09-01 17:20:31.000 | | Closure Per User |
| 2015-09-01 17:21:19.000 | | Closure Per User |
| 2015-09-02 06:51:02.000 | | Opening Per User |
| 2015-09-02 06:51:50.000 | | Opening Per User |
| 2015-09-02 16:18:27.000 | | Closure Per User |
| 2015-09-02 16:19:15.000 | | Closure Per User |
| 2015-09-03 08:56:09.000 | | Opening Per User |

Daily Alerts A-TLR
August

| Monday | Tuesday | Wednesday | Thursday | Friday | Saturday | Sunday |
|---|---|---|---|---|---|---|
| | | | | | ○ 2015/08/01 | ○ 2015/08/02 |
| ○ 2015/08/03 | ○ 2015/08/04 | ○ 2015/08/05 | ○ 2015/08/06 | ○ 2015/08/07 | ○ 2015/08/08 | ○ 2015/08/09 |
| ○ 2015/08/10 | ○ 2015/08/11 | ○ 2015/08/12 | ○ 2015/08/13 | ○ 2015/08/14 | ○ 2015/08/15 | ○ 2015/08/16 |
| ○ 2015/08/17 | ○ 2015/08/18 | ○ 2015/08/19 | ○ 2015/08/19 | ○ 2015/08/20 | ○ 2015/08/21 | ○ 2015/08/22 |
| ○ 2015/08/24 | ○ 2015/08/25 | ○ 2015/08/26 | ○ 2015/08/27 | ● 2015/08/28 | ○ 2015/08/29 | ○ 2015/08/30 |

September

| Monday | Tuesday | Wednesday | Thursday | Friday | Saturday | Sunday |
|---|---|---|---|---|---|---|
| | ○ 2015/09/01 | ○ 2015/09/02 | ○ 2015/09/03 | ○ 2015/09/04 | ○ 2015/09/05 | ○ 2015/09/06 |
| ● 2015/09/07 | ○ 2015/09/08 | ○ 2015/09/09 | | | | |

FIG. 3

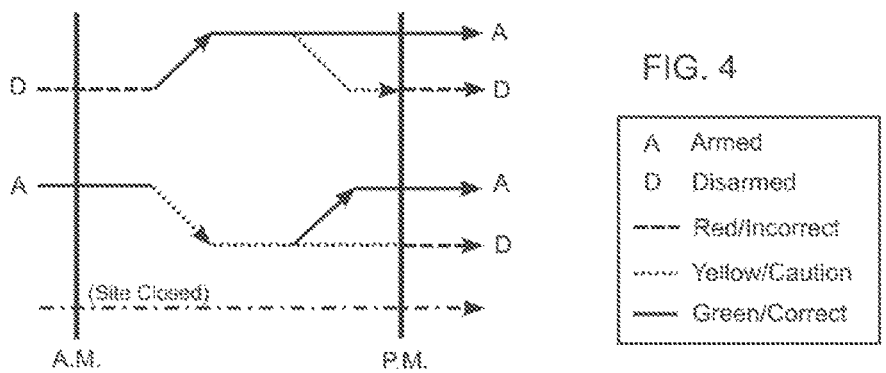

FIG. 4

A  Armed
D  Disarmed
----  Red/Incorrect
······  Yellow/Caution
——  Green/Correct

FIG. 5

| Radiation + Accesses | Radiation Register | Alarm Systems | Access System | Maintenance Reports |

Selected Date Range:
2015/09/08 - 2015/09/09, EDIT

Measure
[Greater Than ♦] [0.0]
[Continue]

140

(accesses, and dosimetry accumulated every five minutes, for measurements > 0.0 mSv / h.)

| Date | Measure | Event | Generated By | Door | User |
|---|---|---|---|---|---|
| 2015-09-08 10:50:00 | | | | | |
| 2015-09-08 10:50:03 | | Door Closed / Normal Condition | System | KT-315 BUNKER DOOR 1 | |
| 2015-09-08 10:50:22 | 1.8 | | | | |
| 2015-09-08 10:51:20 | | Forced Door | Sensor | KT-315 BUNKER DOOR 1 | |
| 2015-09-08 10:51:20 | | Entry - Exit of person | User | KT-315 BUNKER DOOR 1 | |
| 2015-09-08 10:51:24 | | Entry - Exit of person | Sensor | KT-315 BUNKER DOOR 1 | |
| 2015-09-08 10:52:00 | | Entry - Exit of person | Sensor | KT-315 BUNKER DOOR 1 | |
| 2015-09-08 10:52:14 | 1.700 | | | | |
| 2015-09-08 10:53:16 | | Forced Door | User | KT-315 BUNKER DOOR 1 | |
| 2015-09-08 10:53:20 | | Entry - Exit of person | Sensor | KT-315 BUNKER DOOR 1 | |
| 2015-09-08 10:53:50 | | Entry - Exit of person | Sensor | KT-315 BUNKER DOOR 1 | |
| 2015-09-08 10:54:08 | | Entry - Exit of person | Sensor | KT-315 BUNKER DOOR 1 | |
| 2015-09-08 10:54:20 | 0.856 | | | | |
| 2015-09-08 10:55:16 | | Forced Door | User | KT-315 BUNKER DOOR 1 | |
| 2015-09-08 10:55:16 | | Entry - Exit of person | Sensor | KT-315 BUNKER DOOR 1 | |
| 2015-09-08 10:55:20 | | Entry - Exit of person | Sensor | KT-315 BUNKER DOOR 1 | |
| 2015-09-08 10:55:52 | | Entry - Exit of person | Sensor | KT-315 BUNKER DOOR 1 | |
| 2015-09-08 10:55:56 | 0.146 | | | | |
| 2015-09-08 10:57:00 | | Forced Door | User | KT-315 BUNKER DOOR 1 | |

FIG. 7

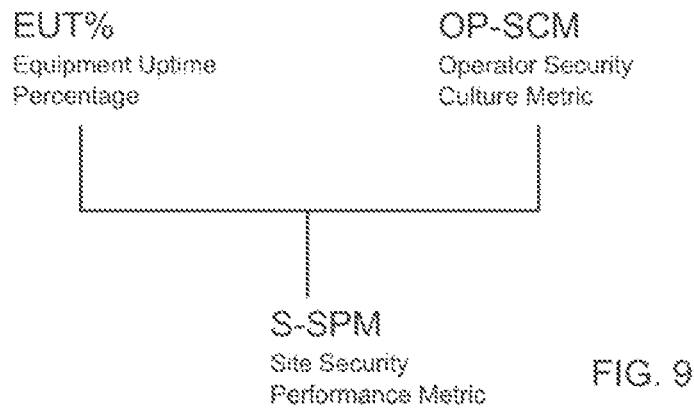
FIG. 9
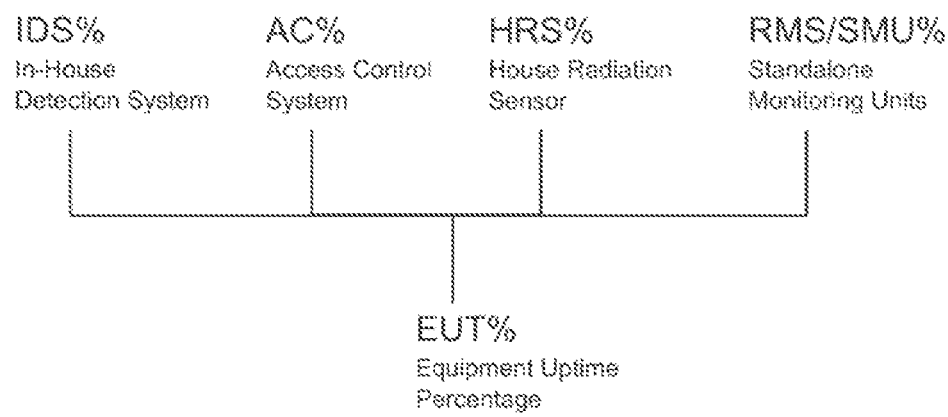
FIG. 10
FIG. 11
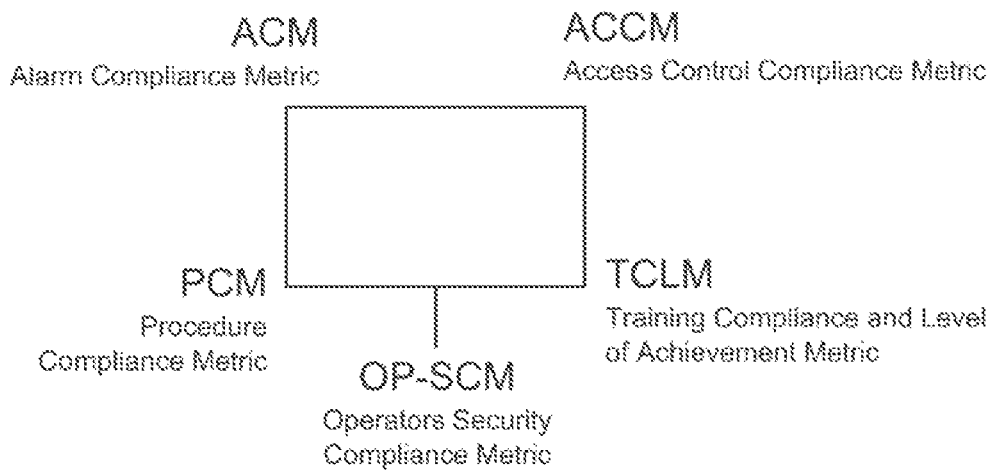

100 ⟶

| | GROUP Avg. | |
|---|---|---|
| | Compliance | Achievement |
| Supervisor | 92% | 3.8 |
| Active Shooter | 67% | 3.2 |
| Bomb Threat | 55% | 5 |
| CyberSecurity | 99% | 5 |
| Radiological Dispersal Device (RDD) | 100% | 3.3 |
| Password Management | 98% | 2.8 |
| Suspicious Behavior Detection | 99% | 3.8 |
| First Aid | 79% | 4 |
| Secure Communications | 88% | 3.5 |
| Defensive Driving | 97% | 3.1 |
| Crowd Control | 99% | 2 |
| Internal Patrol Officer | 95% | 4.8 |
| Active Shooter | 67% | 3.2 |
| Bomb Threat | 55% | 5 |
| CyberSecurity | 99% | 5 |
| Radiological Dispersal Device (RDD) | 100% | 3.3 |
| Suspicious Behavior Detection | 98% | 2.8 |
| First Aid | 99% | 3.8 |
| Secure Communications | 79% | 4 |
| Crowd Control | 88% | 3.5 |
| Mobile Officer | 88% | 4.5 |
| Active Shooter | 67% | 3.2 |
| Bomb Threat | 55% | 5 |
| Radiological Dispersal Device (RDD) | 99% | 5 |
| Suspicious Behavior Detection | 100% | 3.3 |
| First Aid | 98% | 2.8 |
| Secure Communications | 99% | 3.8 |
| Defensive Driving | 79% | 4 |
| Mobile Officer | 76% | 3.6 |
| Active Shooter | 67% | 3.2 |
| Bomb Threat | 55% | 5 |
| Radiological Dispersal Device (RDD) | 99% | 5 |
| Suspicious Behavior Detection | 100% | 3.3 |
| First Aid | 98% | 2.8 |
| Secure Communications | 99% | 3.8 |

CATEGORIZING COMPLIANCE WITH SECURITY PROTOCOLS

FIELD OF THE DISCLOSURE

The disclosure relates to a system and method for monitoring compliance with a security protocol, and in particular, categorizing equipment performance, alarm control, and access control, and generating procedural and preparedness data to generate a visual indication of the compliance of a facility over time.

BACKGROUND OF THE DISCLOSURE

In the Nuclear and Radiological arena, the IAEA and other Agencies around the world are working with Member States to increase control, accounting and security of radioactive sources to prevent their malicious use and the associated potential consequences. It is the responsibility of the Member States to provide for the physical protection of nuclear and other radioactive material and their associated facilities. Accordingly, there has been a global trend towards increased control with the majority of Member States having engaged in enacting, reviewing, enhancing or amending a more comprehensive set of In-Country Physical Security regulations.

IAEA Nuclear Security Series No. 20 defines "Objective and Essential Elements of a State's Nuclear Security Regime", including "Detection of Nuclear Security Events" (Section 3.1) and "Sustaining a Nuclear Security Regime" (Section 3.12).

SUMMARY OF THE DISCLOSURE

In an embodiment of the disclosure, a method of quantifying compliance with critical security protocols, comprises communicating data from an alarm system to a server; communicating data from an access system to the server; communicating data from a security task log to the server; communicating data relating to training to the server; combining and analyzing the alarm system, access system, security task log, and training data using a processor in the server and visually presenting the analyzed data on an output display device as numerical values corresponding to each type of data, the values representing a security risk for each type of data, a single combined numerical value corresponding to a combination of the numerical values for each type of data, and graphical objects using shapes and colors which represent the numerical values and the single combined numerical value.

In variations thereof, the method further includes communicating data from a sensor log to the server; and/or when combining and analyzing, the sensor log is further combined and analyzed.

In another embodiment of the disclosure, a system for indicating compliance with security protocol rules, comprises an alarm system including one or more alarm sensors, the alarm system connected to electronic data storage for storing alarm data including a state of the alarm and a time when a state of the alarm was changed, the state including armed and disarmed, the alarm configured for transmitting a signal to a remote emergency responder in the event of an intrusion when the alarm state is armed; an access control system including one or more access sensors, the access system connected to electronic data storage for storing access data including information pertaining to location and time of accesses to one or more secured areas; a first electronic control circuit cooperative with the alarm system to transmit the alarm data to a remote processor; a second electronic control circuit cooperative with the access control system to transmit the access data to a remote server; the remote processor configured to execute software stored on non-transitory media to: access stored data pertaining to alarm protocol rules; access the transmitted alarm data; access stored data pertaining to access control protocol rules; access the transmitted access control data; categorize the transmitted alarm data for each of a series of successive predetermined time periods according to the stored alarm protocol rules, the categories including at least two states corresponding to non-compliant and compliant with the alarm protocol rules; categorize the transmitted access control data for each of a series of successive predetermined time periods according to the stored access protocol rules, the categories including at least two states corresponding to non-compliant and compliant with the access control protocol rules; calculate an alarm metric value corresponding to adherence to the alarm protocol rules by applying the formula (number of compliant days*x)+(number of non-compliant days*y)/(total number of days) where x and y are each a weighting multiplier; calculate an access metric value corresponding to adherence to the access protocol rules by applying the formula (number of compliant days*x)+(number of non-compliant days*y)/(total number of days) where x and y are each a weighting multiplier; calculating a combined value of the alarm metric and the access metric to produce a single value indicative of overall compliance; and cause an output on a computer display of the alarm metric, the access metric, and the combined value, for evaluation of security compliance.

In a variation thereof, the remote processor is further configured to: when categorizing the transmitted alarm data for each of a series of successive predetermined time periods according to the stored alarm protocol rules, include a third state corresponding to possibly compliant with the alarm protocol rules; when categorizing the transmitted access control data for each of a series of successive predetermined time periods according to the stored access protocol rules, include a third state corresponding to possibly compliant with the access control protocol rules; when calculating the alarm metric value corresponding to adherence to the alarm protocol rules, add the third state by modifying the formula to include the third state: (number of compliant days*x)+(number of non-compliant days*y)+(number of possibly compliant days*z)/(total number of days) where x and y and z are each a weighting multiplier; and when calculating the access control metric value corresponding to adherence to the access control protocol rules, add the third state by modifying the formula to include the third state: (number of compliant days*x)+(number of non-compliant days*y)+(number of possibly compliant days*z)/(total number of days) where x and y and z are each a weighting multiplier.

In another variations thereof, when categorizing the transmitted alarm data for each of a series of successive predetermined time periods, time periods in which the alarm system is not recording data are not included.

In a further variation thereof, the remote processor is further configured to: access stored data pertaining to the security protocol rules; and when calculating a combined value of the alarm metric and the access metric to produce a single value indicative of overall compliance, the combined value is categorized into one of three states corresponding to compliant, possibly compliant, and non-compliant, with respect to the security protocol rules.

In other variations thereof, the system further includes an uptime electronic control circuit cooperative with at least one hardware system selected from the alarm system, the access control system, and a radiation monitoring system, the uptime electronic control circuit operative to transmit a readiness state of the selected at least one hardware system; and/or the transmitted readiness state is categorized and combined with the alarm metric value and the access metric value to produce a site metric value incorporating operator compliance with respect to the alarm and access systems and an equipment readiness state, to determine a state of protection for a site protected by the alarm and access control systems.

In another embodiment of the disclosure, a method for indicating compliance with security protocol rules comprises connecting an alarm system through a network to a server, the alarm system including one or more alarm sensors, the alarm system connected to electronic data storage for storing and communicating alarm data to the server, the data including a state of the alarm and a time when a state of the alarm was changed, the state including armed and disarmed, the alarm configured for transmitting a signal to a remote emergency responder in the event of an intrusion when the alarm state is armed; connecting an access control system through a network to a server, the access control system including one or more access sensors, the access system connected to electronic data storage for storing and communicating access data to the server, the data including information pertaining to location and time of accesses to one or more secured areas; a first electronic control circuit cooperative with the alarm system to communicate the alarm data to a remote processor of the server; a second electronic control circuit cooperative with the access control system to communicate the access data to a remote processor of the server; the remote processor configured to execute software stored on non-transitory media to: access stored data pertaining to alarm protocol rules; access the transmitted alarm data; access stored data pertaining to access control protocol rules; access the transmitted access control data; categorize the transmitted alarm data for each of a series of successive predetermined time periods according to the stored alarm protocol rules, the categories including at least two states corresponding to non-compliant and compliant with the alarm protocol rules; categorize the transmitted access control data for each of a series of successive predetermined time periods according to the stored access protocol rules, the categories including at least two states corresponding to non-compliant and compliant with the access control protocol rules; calculate an alarm metric value corresponding to adherence to the alarm protocol rules by applying the formula (number of compliant days*x)+(number of non-compliant days*y)/(total number of days) where x and y are each a weighting multiplier; calculate an access metric value corresponding to adherence to the access protocol rules by applying the formula (number of compliant days*x)+(number of non-compliant days*y)/(total number of days) where x and y are each a weighting multiplier; calculating a combined value of the alarm metric and the access metric to produce a single value indicative of overall compliance; and cause an output on a computer display of the alarm metric, the access metric, and the combined value, for evaluation of security compliance.

In a variation thereof, when categorizing the transmitted alarm data for each of a series of successive predetermined time periods, time periods in which the alarm system is not recording data are not included.

In another variation thereof, the remote processor is further configured to: access stored data pertaining to the security protocol rules; and when calculating a combined value of the alarm metric and the access metric to produce a single value indicative of overall compliance, the combined value is categorized into one of three states corresponding to compliant, possibly compliant, and non-compliant, with respect to the security protocol rules.

In further variations thereof, the method further includes using an uptime electronic control circuit cooperative with at least one hardware system selected from the alarm system, the access control system, and a radiation monitoring system, the uptime electronic control circuit operative to transmit a readiness state of the selected at least one hardware system; and/or the transmitted readiness state is categorized and combined with the alarm metric value and the access metric value to produce a site metric value incorporating operator compliance with respect to the alarm and access systems and an equipment readiness state, to determine a state of protection for a site protected by the alarm and access control systems.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 3 depicts a data table and status icons of the disclosure, for alarm data, displayed upon a computer display generated by a system of the disclosure;

FIG. 4 depicts an analysis and categorization of an alarm state for a discrete time period, in accordance with the disclosure;

FIG. 5 depicts a data table and status icons of the disclosure, for access control data, displayed upon a computer display generated by a system of the disclosure;

FIG. 7 depicts a combined display of radiation level and access control data generated by a system of the disclosure;

FIG. 9 depicts a relationship between equipment and operator security in forming a site security performance metric of the disclosure;

FIG. 10 depicts a relationship of the disclosure between equipment uptime for various hardware components in forming a systemwide equipment uptime value;

FIG. 11 depicts a relationship of the disclosure between alarm and access control system security Compliance metrics and a security Compliance metric for an operator of a facility;

FIGS. 12A-12G depict an alternative Regulator Information Dashboard (RID) interface of a system of the disclosure, in which:

FIG. 12A depicts an operator security Compliance Metric,

FIG. 12B depicts an Equipment Uptime information,

FIG. 12C depicts a synthesis of FIGS. 12A-12B in an Operator Security Compliance Metric, FIG. 12D depicts data pertaining to the Training Compliance Level Metric of FIG. 12E, FIG. 12E depicts a graphical representation of the Training Compliance Level Metric, FIG. 12F is a graph of compliance with an access protocol, and FIG. 12G is a graph of compliance with an access protocol by various agents;

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The disclosure provides a system 100 and method for assisting a regulator, administrator, supervisor, auditor, hereinafter simply regulator, to more effectively enforce physical security regulation as a part of a sustainable long-term security initiative. While the disclosure is particularly useful for nuclear regulators, the disclosure can be effectively used by any regulator in the applicable industry. A system of the disclosure measures the performance of physical systems and installed upgrades, as well as human performance and preparedness, against predetermined standards and procedures.

System 100 can be used as a tool to help Country Regulators in their efforts to enforce physical security regulations and/or to monitor the performance of a security solution. As such, the disclosure is particularly useful for category 1 and 2 installations taking into consideration a graded approach specified in IAEA Security Standards. Additionally, the disclosure can be used as a tool for dual control as detailed in the IAEA GSR Part 3. In particular, the disclosure enables security installations to gather valuable information required to perform their security analysis in line with IAEA GSR Part 4. Additionally, the disclosure provides a practical application of the interdependencies between safety and security in the framework of a sustainable regulatory control.

Figure 1:
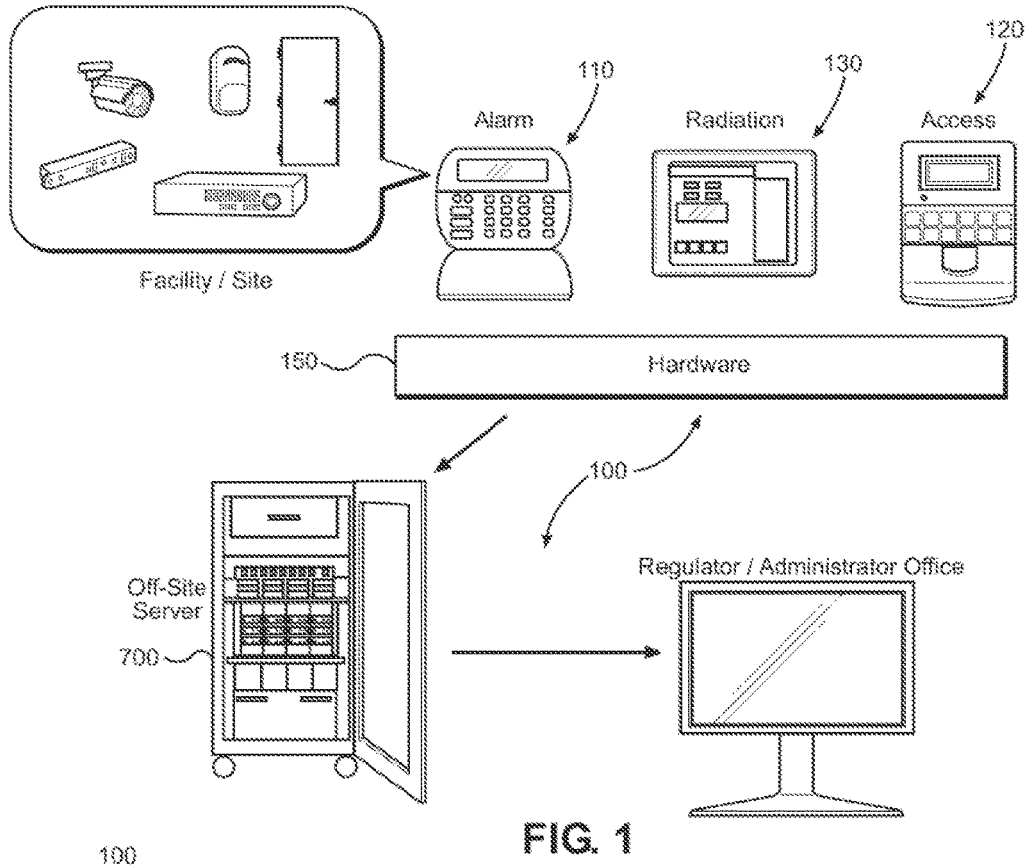
FIG. 1 depicts hardware and software components and locations of various components of a system of the disclosure.

A system 100 of the disclosure can provide regulators with information pertaining to: (1) reliable on-demand activity of source material at a facility, (2) personnel who have accessed a specific controlled zone, (3) whether a facility is appropriately using its security system, (4) whether equipment and upgrades installed are performing as expected, (5) whether defined procedures are being followed, and (6) whether personnel is complying with preparedness activities and required achievement level. With reference to FIG. 1, to provide the foregoing information, system 100 utilizes information from an alarm security system 110, an access control system 120, event reporting tools 140, and training and education platforms (160). To provide information on radiation exposure, the facility must also have radiation sensing equipment 130 which can transmit information to system 100. To do so, system 100 can include middleware 150 which can be software and/or hardware, which can convert data available from these systems into a common format, and can transmit the information to one or more servers 700. In some instances, systems 110, 120, and 130 can be configured to communicate directly with, and become a part of, system 100. System 100 aggregates data from these three systems, including data transmission, parsing, and analysis, and presents the results in an integrated, economically-viable, on-demand, secure, and easy to understand manner.

The disclosure further addresses the need in industries other than nuclear related industries, for new tools and methodologies to define employee bonification, ensure compliance with industry guidelines and enhance workforce preparedness.

While System 100 can provide monitoring and alerting information, it is intended to complement an access and alarm monitoring system, and a central station monitoring service, by providing an overview of procedure compliance within a facility. To do so, system 100 receives information from computers or embedded systems of alarm, access control, event reporting and preparedness systems and devices 110, 120 installed and operating at the facility, or from middleware 150, which are either accessible to, or produce results available to regulators or other operators or users of system 100.

Figure 2:
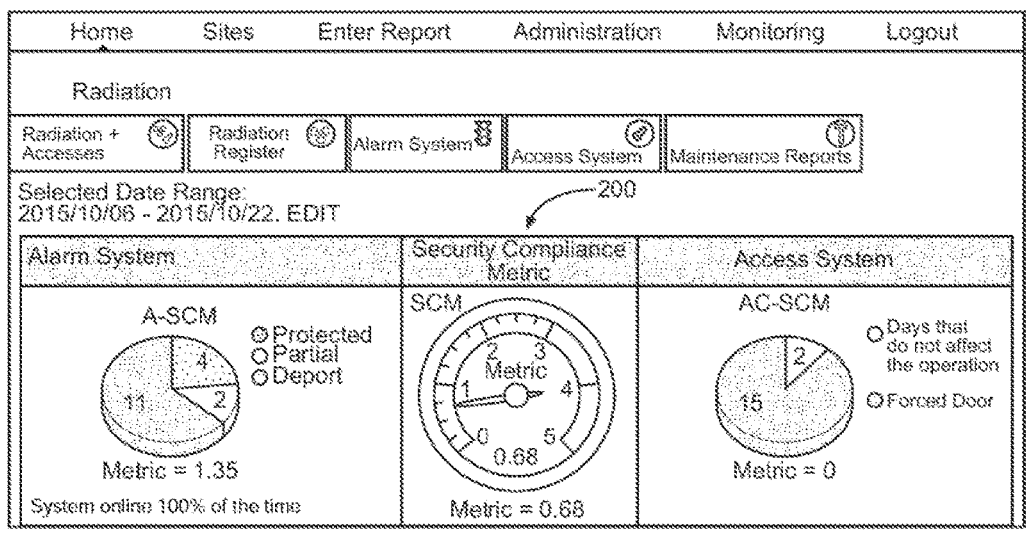
FIG. 2 depicts a Regulator Information Dashboard (RID) interface of a system of the disclosure.

With reference to FIG. 2, system 100 includes a user interface or Regulator Information Dashboard (RID), which provides a simple overview of the compliance status of a facility, with ready access to detailed information. System 100 is accessible to users using a computer connected to server 700 by any known means, including a LAN or WAN, such as the Internet, via wired or wireless means. A date range can be selected, after which system 100 presents 5 main sections representing data corresponding to the selected date range, including: Alarm System Report, Radiation Levels Reports, Access Reports, Procedure and Event Reports, Preparedness and Preparedness Level Reports, Rad+Access Reports and Maintenance Reports, and additionally, a Security Compliance Metric 200.

In accordance with the disclosure, by combining an Alarm Security Compliance Metric (A-SCM) and an Access Control Security Compliance Metric (AC-SCM), each described in detail below, a reliable indicator of overall security Compliance at a facility can be readily understood. The information from each of the foregoing systems can be processed through a second algorithm to produce a Security Compliance metric.

In this embodiment, metric 200 is a dial indicating a scale from 1 to 5, 1 being the least satisfactory metric. Color values are associated with ranges of the dial, 0-1 being red, 1 to 3 being yellow, and 3 to 5 being green. The range of numbers and the colors selected can be chosen for a desired accuracy range or colors which culturally best identify a relative range of compliance or non-compliance with a procedure/protocol, as indicated by the metric. The security metric is composed of a first metric value corresponding to use of alarm system 110, and a second metric value corresponding to use of access system 120. In the illustrated example, the alarm metric value, or A-SCM is 1.35, and the access metric value, or AC-SCM is 0, resulting in an overall security Compliance metric, or SCM having an average of the two preceeding values 0.68 in accordance with the formula:

(A-SCM+AC-SCM)/2    S-SCM:

Other formulations can be applied, however, if it is deemed for example that one or the other of the alarm compliance or access compliance is relatively more important. Additionally, radiation exposure can be factored into the security metric 200 as a radiation index, if desired. For example, a multiplier can be applied to any one or more of the alarm index, access index, and radiation index, to produce a weighted security metric 200 which assigns a greater or lesser weight to any of the three indexes, as appropriate for a particular facility.

In accordance with the disclosure, security culture can be more accurately identified or characterized when compliance is achieved in the absence of prescriptive or coercive measures. In an alternative embodiment of the disclosure, an extent of prescriptive or coercive measures, or regulation, is evaluated. An interface is provided within system 100 to specify the type of regulation, or lack thereof, which governs the security installation. Accordingly, the extent of regulation can be factored into an overall evaluation of the security culture of a facility.

Typically, at every site except those which operate 24 hours per day, the 'working' or 'business' hours segment of the day is secured by access control equipment while during closed or 'non working' hours, the facility is secured by an alarm system. If a site only has an alarm system installed, the RID will display the Site Security Compliance Metric (S-SCM) based exclusively on information collected from the Alarm System. If the site has an alarm and access control systems installed, then the RID will assign equal weight or a predetermined weight to each individual index when producing the S-SCM. The following paragraphs describe how the RID calculates each individual metric and the resulting S-SCM.

By using a quick and easily understood traffic signal code, a regulator can quickly identify facilities which are exhibiting problems complying with a security protocol. The RID tracks how personnel are trained and how it interacts with the security equipment and procedures put in place to secure a facility, and facilitates corrective action, including holding responsible people accountable when improperly interacting with those systems.

Alarm System

The alarm index is calculated, in an embodiment, by assigning a status code corresponding to compliance with a predetermined security protocol pertaining to use of an alarm system at one or more related facilities to be monitored. FIG. 3 illustrates a computer display illustrating example data for a facility, corresponding to alarm system usage, which is accessible from the RID by selecting 'Alarm System'.

Alarm System reports are extracted from information gathered from the Alarm Monitoring Reports. The system parses the reports and uses a proprietary algorithm to present a "traffic light" structure where the regulator can see a green, yellow or red status for each day, which indicates if the security system is being used as intended.

In FIG. 3, data table 118 includes data corresponding to alarm events 114. An indicating button or icon 112 is represented for each illustrated day of monitoring, the color of the circle indicative of a quality of compliance with an alarm protocol, which can be maintaining an alarm state, or the compliance of the facility with the applicable alarm protocol. Advantageously, the colors correspond to the relative compliance quality levels that are also used by security matrix 200. Numerical data giving rise to the color indication can additionally be viewed in a table 128.

With reference to FIG. 4, a method of determining a level or quality of compliance with an alarm protocol is depicted, in which a red/yellow/green traffic coding system is used, which provides a quick reference of compliance with a security protocol, in this case with an alarm protocol. In this example, a green state (solid line in FIG. 4) indicates the alarm status is armed, which is deemed an appropriate state whether during working hours or outside working hours. For example, the alarm state can correspond to that of a high security room or chamber which is normally armed unless it is being properly accessed. For example, the security room may be closed all day on some days, or may be opened only briefly each day. Accordingly, the alarm state should generally be armed.

A yellow state (dotted line in FIG. 4) indicates a 'caution' state, in which the alarm protocol was not completed, e.g. the alarm was disarmed but not armed again during the same day, whereupon care, attention, or further investigation may be warranted. For example, a yellow state can be indicated during business hours, indicated by a.m. and p.m. in the example illustration, when it may be normal for an alarm to be turned off. It should be understood that business hours can correspond to any part of the day, as determined by a particular facility. Business hours can also refer to a change in shift, in which a particular alarm state is required at the start of each shift, for example. A yellow or caution state can additionally indicate that follow up is required to reactivate an alarm after an access, for example.

A red state (dashed line in FIG. 4) indicates a non-compliant state in which the alarm is not armed, and the time is outside business hours, or otherwise during a period or condition when an armed state is always required or is otherwise expected, for example when no guard or staff are present.

Referring again to FIG. 2, it may be seen that A-SCM is depicted as a pie chart showing the number of time units in which the alarm system was in each of the various states of compliance. In this example, given time units of one day, it may be seen that the alarm was in a green or protected stated for 4 days, a caution state for 2 days, and an unprotected state for 11 days.

With respect to the AC-SCM, it can be seen that of the 17 day period, there were two days in which the access control system was not expected to be used and therefore not counted in the formulating the metric, and 15 days for which the access control system was in a non-compliant 'forced' or bypassed state, contributing to an overall red state for the site (SCM).

FIG. 4 illustrates examples of applications of the red/green/yellow traffic signal coding system described above. An upper sequence indicates a condition in which an alarm state is disarmed outside of business hours, shown in red or dashed lines, to indicate incorrect compliance with the alarm protocol. Subsequently, at some point during business hours, the alarm is set to armed, indicated by a solid upwardly extending arrow. Two alternative scenario's are then illustrated. In the first path at the upper right, the alarm remains armed for the remainder of business hours and after business hours. The lower path indicates that at some point during business hours, the alarm was disarmed, indicated by a yellow/dotted line up until the end of business hours. However, the alarm is not armed at the end of business hours, and the status then changes to red state, or incorrect adherence to the protocol.

A lower sequence begins with an armed state outside business hours, which corresponds to a green or correct status. Subsequently, during business hours, the alarm state is changed to disarmed, which corresponds to a yellow status. Next the upper path at the lower right indicates the alarm is set to armed prior to and following an end of business hours, which is correct, and indicates a green status. The lower, alternative path, indicates that the alarm status was not changed to armed at the end of business hours, after which the alarm status becomes Red. Finally, a dashed-dotted line indicates that the site or facility is closed, or in other respects compliance data is not available or relevant for analysis.

At any given point in the day, the alarm status of a facility can be characterized as Yellow/Caution, Green/Correct, or Red/Incorrect. Accordingly, the alarm index for a given facility can be assigned for an entire day using any one of three approaches:

1) the least compliant status observed during that day;
2) the status at one point in the day, for example just after close of business, or
3) the least compliant state at any of a plurality of points in the day, for example at the least compliant state at either the end of business hours or just before the start of business hours.

Referring again to FIG. 3, an Alarm Traffic Light Report (A-TLR) is a simplified representation of user behavior related to the alarm system installed at a site. The A-TLR is produced by analyzing and processing the events reported by the alarm system using the algorithm described below. This report, presented in FIG. 3 as raw data and a graphical representation for each day of alarm compliance, is an effective and efficient representation of security Compliance, as it shows how the human element interacts with the equipment installed, whether in accordance with or in contradiction to established protocols.

The disclosure enables a visual and rapid understanding of a security Compliance at a facility or site. Low metrics for alarm and access state are one indication of a potentially problematic security Compliance, but an extended yellow period can be another. For example, if any of alarm, access, or radiation monitoring equipment at a facility remain in an unrepaired state for an unduly long period of time, a yellow or caution state can be upgraded to a red state, or an indication of a security Compliance problem can otherwise be generated by system 100. An unduly long period may differ depending on the circumstances, where several hours can be unduly long at one facility, and at another, it may be several days or longer.

In an embodiment, system 100 processes the values derived from the alarm system, such as are shown in FIG. 3, through a second algorithm in order to produce an Alarm Security Compliance Metric (A-SCM):

$$[(Green*1.0+Yellow*0.3+Red*0.0)/Total\ Days]*5 \quad \text{A-SCM:}$$

As such, the A-SCM is an indication of alarm compliance where a higher number indicates greater compliance, with a green status given a substantially higher weighting than a yellow state, and where a day of red status does not cause an increase in the A-SCM at all. The multiplier values in this second algorithm are determined by the risk that each of the categorized behaviors represent for the given industry or application.

It is noted that a determination of Total Days can exclude days in which the alarm system is not working properly, so that human compliance can be best understood. Thus, if a specific day is indicated as a system failure day, the data for that day is not used to calculate the A-SCM, but is included in a site failure report.

Access Control System

Figure 5:
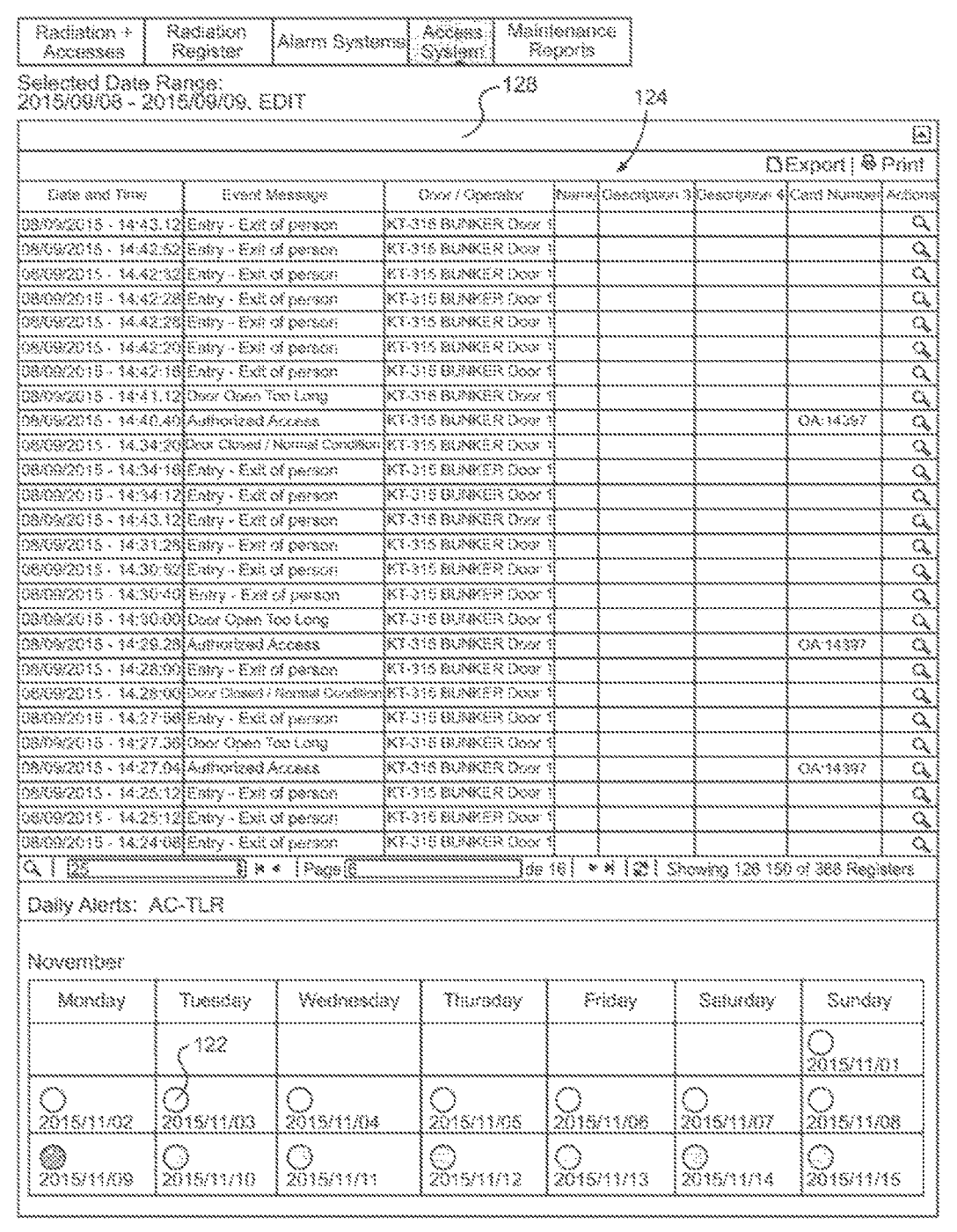

The access control system includes one or more devices which control access to areas of a facility, such as secure or controlled zones. Access control devices can include any form of locking device where the functioning is automatically controlled or observed by system 100. Advantageously, access control devices include biometric devices such as fingerprint or retina scanners, although card readers, keypads, and keys, for example, can also be used. With reference to FIG. 5, a report 128 details access to areas of the facility, and indicates whether the access was authorized or, if the system is so equipped, whether the access was by force or bypass of the lock. The access control system can operate locks based upon authorized access, and record the time, location accessed, and person who accessed the secured area. In an embodiment, the access control system does not operate the locks, but merely records the foregoing data.

The access index is calculated, in an embodiment, by assigning a status code corresponding to compliance with a predetermined security protocol pertaining to use of an access system at one or more related facilities to be monitored. The data in FIG. 5 is accessible from the RID by selecting 'Access System'. An Access Control Traffic Light Report, or AC-TLR is produced by analyzing and processing the events reported by the Access Control System, such as are shown in FIG. 5. The example AC-TLR report shown in FIG. 5 is based on data corresponding to access events 124, shown in data table 128. An indicating button or icon 122 is represented for each illustrated day of monitoring, the color of the circle indicative of a level or quality of compliance with an access control protocol, which is indicative of compliance of the facility with the applicable access control protocol. Advantageously, the colors correspond to the relative compliance quality levels that are also used by security matrix 200.

Viewing access compliance with a traffic light code system, as is the case with the A-TLR for the alarm system, is an effective and efficient representation of security Compliance, as it shows how the human element interacts with access equipment installed, whether in accordance with or in contradiction to established protocols. The AC-TLR details user activity when accessing the controlled zone. System 100 assigns a traffic light code for each day, based upon particular access events during the day. In an embodiment, the color selected is determined by the presence of the highest ranked event during a 24 hour period. In one embodiment, the rankings are as follows:

1—Red (Forced door): The door was opened without using the card/fingerprint. This often includes using an override key, but can include applying force or tampering to open the door or opening.

2—Yellow (Door Manipulation): The door was opened modifying the configuration in the software.

3—Blue (Door open too long): The door was kept open for more time than is acceptable, which time can be a predetermined stored value that is accessible to system 100.

4—Green (No events): The users are operating the door as intended.

5—Gray: system 100 determines that the site was not in operation during the period, and data corresponding to the day does not positively or negatively affect the security Compliance metric.

For example, assuming the system detects a yellow event, the day is provisionally characterized as code yellow; however, if a subsequent red event is detected that same day, the day will now be characterized as code red by system 100. If a blue event was detected instead of a red event, system 100 would have continued to characterized the day as code yellow.

System 100 processes the values generated by the AC-TLR through a second algorithm to produce the Access Control Security Compliance Metric:

[(Green*1.0+Blue*0.8+Yellow*0.5+Red*0.0)/Total Days]*5   AC-SCM:

The multipliers can be different for different facilities. The multiplier values in this algorithm are determined by the risk that each of the categorized behaviors represent for the given industry or application. A higher AC-SCM value indicates greater compliance with an access control protocol. It is noted that a determination of the "Total Days" value can exclude days in which not only is there no access control activity during the day, but there is further no activity noted by the alarm system during the day. System 100 could presume, for example, that this was a non-working day, and compliance with an access protocol for the day would not be measured and included in the AC-SCM or a resultant SCM.

In an embodiment, access control can be measured for other types of access protocol than entries. For example, where a protocol requires that two different keys are required to be rotated at the same time by two different people, this event can be audited by electronics and reported to system 100.

Similarly, other protocol requirements can be monitored which don't necessarily fit within alarm or access definitions, but which can form part of a security metric, or can individually or collectively form their own security Compliance metric. This can include wearing correct protective garments. For example, a transmitter or transponder can be connected to the garment, and proper movement of the garment, which can be assigned to one or more individuals, can be tracked. The presence of a garment whenever a particular access is granted can additionally be tracked. Another example includes creating a required entry in an electronic log or complying with a specific time to resolve a security task once it is assigned.

Radiation Levels

Figures 6, 6A:
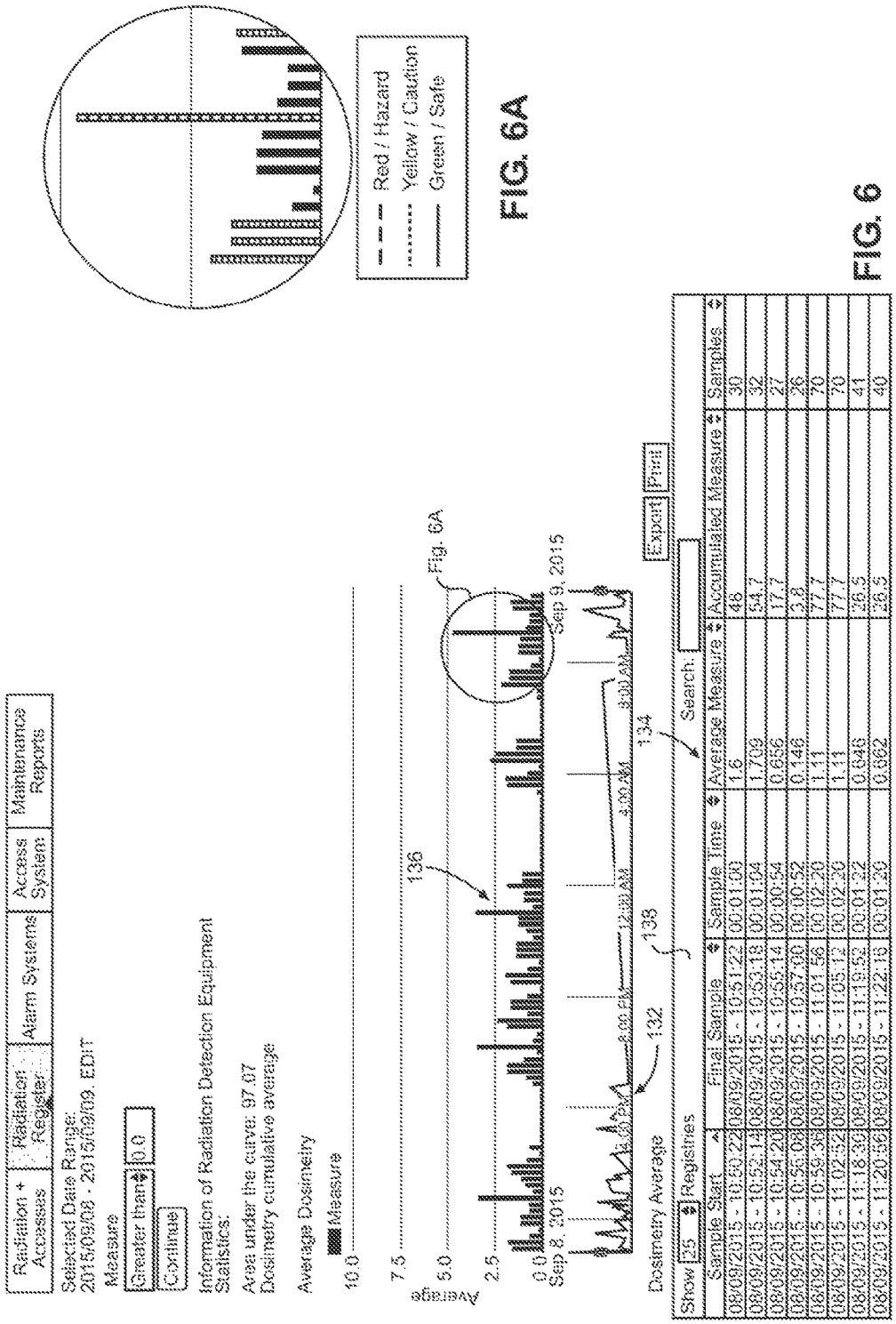
FIG. 6 depicts radiation data displayed upon a computer display generated by a system of the disclosure.
FIG. 6A depicts a detail of FIG. 6, wherein a radiation status is categorized in accordance with the disclosure.

Radiation reports are presented from information gathered from one or more area radiation sensors installed at the facility, bunker, and/or storage area. The sensors can electronically transmit information to system 100. The reports enable the regulator to verify radiation level spikes or source exposure due to a scheduled or un-scheduled removal, or other incident. In FIG. 6, an example data table 138 includes data corresponding to measured and accumulated radiation levels 134 measured by the one or more radiation sensors. This information can be presented in graphical form for rapid analysis. With reference to FIG. 6A, in an embodiment, values over a predetermined level are indicated in the graph in the color red/dashed, to indicate excessively high or hazardous level status, values in a lower level are indicated in yellow/dotted, to indicate a warning status, and values in a very low or undetectable level are indicated in green/solid, to indicate a safe status.

In accordance with the foregoing, a radiation traffic light status can be assigned to each day, as described with respect to alarm and access control systems. Thus, a metric for each day can be established in the manner of an R-SCM. A corresponding SCM value for the day can thus be calculated according to the formula:

SCMr: (AC-SCM*$x$)+(A-SCM*$y$)+(R-SCM*$z$)

where each of AC-SCM, A-SCM, and R-SCM represent a numerical value accorded to each of the red, yellow, or green status values determined for the time period evaluated.

where x, y, and z are weighting factors for their respective matrixes, and are equal to ⅓ if all values are to be weighted equally. However, it should be understood that other formulations can apply. For example, the value of SCMr can be divided by three, particularly if x, y, and z are all one, and an average is desired.

While a traffic light code or metaphor is used herein, it should be understood that other symbolic references can be used, and other colors, with a goal remaining to provide a filtered result for a given time period which is quickly and easily recognized, particularly when there is a large volume of data to be analyzed. While the unit time provided in the examples herein is one day, it should be understood that a series of days, for example a week or month, can be averaged or otherwise summarized in a collective traffic light symbol, for facilitating the evaluation of larger time periods.

As additionally shown in FIG. 6, radiation levels throughout the day 132 can further be illustrated. FIG. 7 illustrates a screen display containing a report 140 showing accesses correlated with dosimetry readings from the area radiation sensors. This report is useful for regulators when validating claims by site personnel of becoming over exposed, and in any type of incident report that indicates an employee's presence in a controlled zone. Area radiation measurements together with personnel access information are not intended to replace a personal dosimeter, but do provide a dose rate that is associated with access, which gives the regulator valuable information for validating conditions experienced by personnel.

Figure 8:
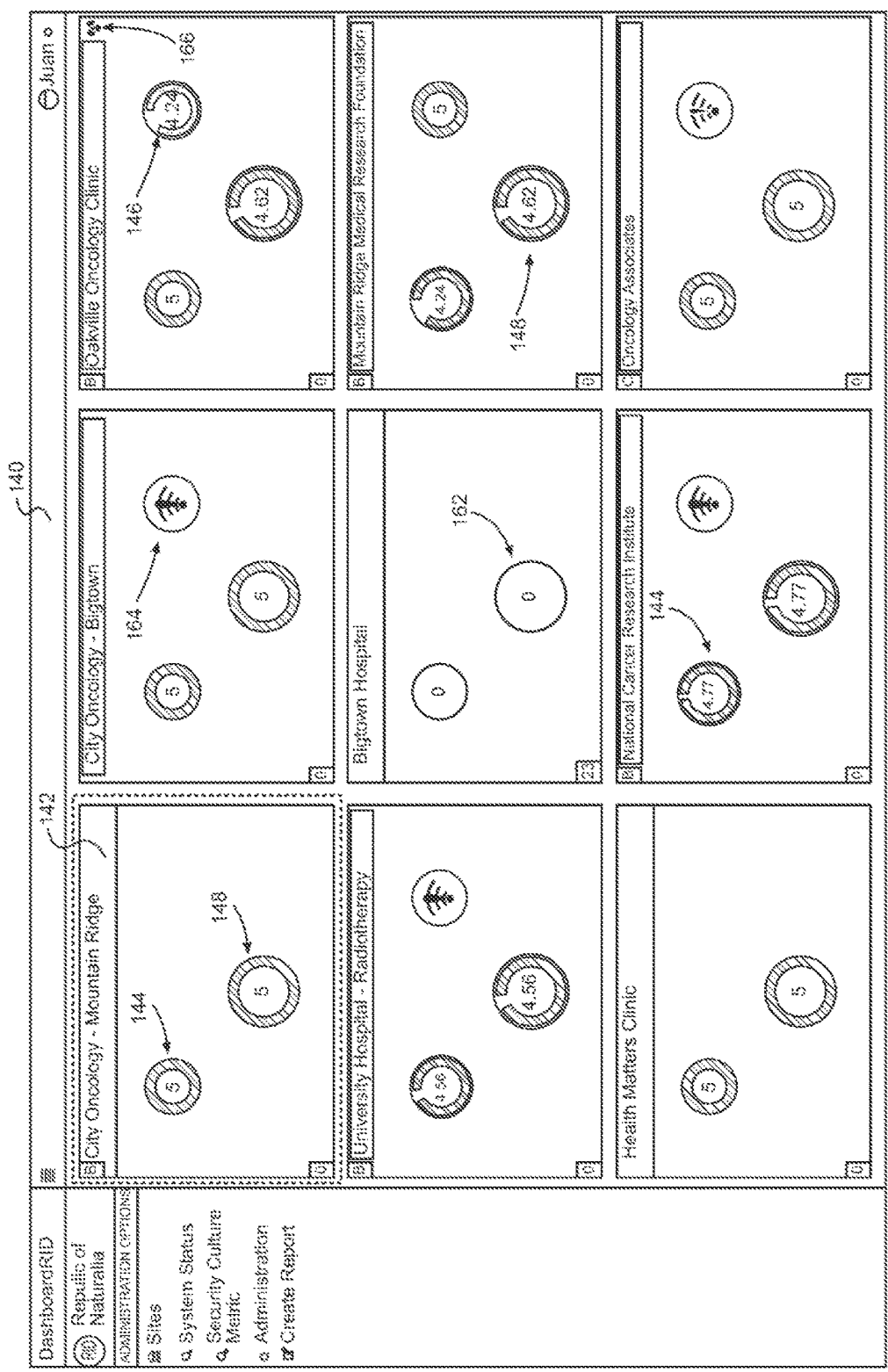
FIG. 8 is a combined display of radiation level and access control data generated by a system of the disclosure, which combines separate facilities within a region.

Referring now to FIG. 8, a report 140 can be generated by system 100 to depict, on a single screen, a graphic 142 block for each of a plurality of facilities, one of which is shown in dashed lines. In FIG. 8, nine such facilities are illustrated, although the report can be wider or longer, and can be scrolled, to represent any number of facilities. FIG. 8 illustrates facilities in a notional country, however blocks 142 can be included to represent facilities organized by type, city, county, region, state, or any other logical grouping. For each site represented within block 142, system 100 graphically presents the A-SCM, in this example at the upper right (indicated by 144), the AC-SCM, in this example at the upper left (indicated by 146), and the combined SCM in this example at the lower center (indicated by 148).

A security Compliance metric at the highest level, in this example 5, is illustrated in hatched lines. Where an security Compliance metric was derived, but is not at the highest level, it is illustrated as a partially completed circle, together with a number indicating the level. Where the lowest value 0 is obtained, it is indicated by a red circle and the numeral '0' (indicated by 162). In several examples, a WIFI symbol is accompanied by an exclamation mark (indicated by 164), indicating that there was no transmission received in an access system which is otherwise set up to transmit data.

As can be seen at the upper right, a radiation icon 166 indicates that the facility includes equipment which is capable of measuring radiation. In an embodiment not illustrated, a radiation security metric can be illustrated, as depicted for alarm and access control in FIG. 8, and the SCM (at 148) can represent a combined value for alarm, access, and radiation security metrics, as described elsewhere herein. Alternatively, a value can be presented which indicates an accumulated radiation level that has been measured. In a further embodiment, the radiation icon can be colored using a traffic light pattern as described elsewhere herein, or in any other pattern, which indicates a relative hazard level. The hazard level can correspond to a change in measured radiation which is substantially above natural ambient levels.

In accordance with the foregoing, system 100 indicates compliance with security preparedness, upgrades performance and protocol rules. System 100 can include an alarm system which has sensors, and is able to store alarm data including an alarm state, for example armed or disarmed, and the time when the alarm state changed. Other data can be stored, including the identity of the facility and the person changing the alarm state, and whether an alarm was triggered and where. The alarm is connected to a phone system, wireless system, and or the internet, so that a signal can be transmitted to a remote emergency responder in the event of an intrusion when the alarm state is armed.

System 100 can additionally include an access control system includes access sensors, typically associated with doors or other access points, and is able to store access data including information pertaining to location and time of accesses to one or more secured areas. Each of the alarm system and access system can independently be configured to transmit this information to a remote server, or their transmission system can be combined. System 100 can additionally include the collection and analysis of data from an event reporting platform deriving in a PCM (Procedure Compliance Metric), as shown in FIGS. 12F-12G, and a training and preparedness platforms deriving in a TCLM (Training Compliance and Level Metric), as shown in FIGS. 12D-12E. This data can complement the SCM according to the formula: SCMr: (AC-SCM*x)+(A-SCM*y)+(R-SCM*z)+(PCM*t)+(TCLM*v), where x, y, z, t, and v are weighting factors which have values that reflect the relative importance of each metric.

System 100 further can include the remote server and software that is executed to access the transmitted alarm and access data, which may have been stored locally, or is stored on a data server. The software also accesses stored data pertaining to alarm and access control protocol rules. Using the transmitted alarm and access control data, the software categorizes this data to generate the respective A-SCM and AC-SCM matrixes. This is carried out by evaluating individual time units, which can be a shift, day, week, or any other time period, to determine a discrete value which represents the quality of adherence to the alarm or access control protocol rules. At least, the rules are categorized according to whether the transmitted data represents compliance with the applicable protocol (a green state), or non-compliance (a red state). Additionally, as shown in the examples herein, a third category can be included, which represents possible compliance (a yellow state). The discrete value is calculated by applying a a factor to each of the number of compliant and non-compliant (and possibly compliant) days, as follows: (number of compliant days*x)+ (number of non-compliant days*y)/(total number of days) where x and y are each a weighting multiplier. This is carried out for each of the alarm data and access control data. Additionally, a combined value of the alarm metric and the access metric can be generated to produce a single value indicative of overall compliance with a security protocol at the facility.

System 100 of the disclosure can additionally be used to monitor compliance in any industry, including banking, industrial processes, such as chemical manufacturing facility, and food safety, for example at a restaurant or food supply warehouse. For example, in addition to or in lieu of alarm and access security Compliance metrics, compliance with maintaining safe pressures and temperatures can be measured and presented as security Compliance matrixes as described herein. Examples include monitoring time a vault is open, parameters of boilers or other process vessels, sufficient cooking times in industrial ovens, or the maintenance of proper temperatures in cold storage.

Maintenance

The RID interface to system 100 additionally provides in-country site maintenance teams a data space for uploading maintenance reports relating to system 100. These maintenance reports can be made accessible to site management and a country regulator for audit purposes.

System 100 and the RID interface can be provided to support any language, and are country independent. Customizable settings, including multiplier weighting values for A-SCM, AC-SCM, and overall SCM. Reports and notifications can additionally be provided. System 100 can work with any alarm or access control system, using middleware 150 where necessary. For improved security, encrypted communication and secure workstation access can further be provided.

Equipment Uptime

The foregoing can be synthesized with an analysis of the performance of equipment of a facility or site, to formulate a Site Security Performance Metric (S-SPM). More particularly, and with reference to FIG. 9, the value EUT % represents an Equipment Uptime Percentage, and the value OP-SCM represents the Security Compliance Metric detailed above, however the prefix OP has been added to clarify that the value represents operator actions as opposed to equipment performance. These two components, EUT % and OP-SCM combine to form the S-SPM.

Uptime corresponds to an amount of time or proportion of time that the system, subsystem, or subsystem component being analyzed is ready to perform its intended function, such that the system is effective. A partially effective system can result in a readiness or uptime value that is lower than a perfect value, or can lower the color state of the system, if a color scheme is applied. The extent of lowering depends on the criticality of the impairment of the system, which can be determined in advance for each system, subsystem, or component.

The EUT % is formed, as shown in FIG. 10, by values for security subsystems, which can include any or all of, at least, the value IDS %, which represents the In-House Detection (Alarm) System uptime percentage; AC %, representing the Access Control System uptime percentage; HRS % representing the House Radiation Sensor uptime percentage; and RMS/SMU %, representing the Standalone Monitoring Units uptime percentage. Other equipment subsystems can be defined, as determined by the equipment installed at a particular site. The uptime percentage for each component can be determined by human observation and/or data uploaded to system 100 from each system, including data from sensors provided to monitor each system.

In FIG. 11, it may be seen that the OP-SCM of FIG. 9 is derived from an Alarm System Security Compliance Metric or OP-ASC, which corresponds to the A-SCM detailed above, with the prefix OP added to designate operator actions, and an Access Control System Security Compliance Metric or OP-ACSC, which corresponds to the AC-SCM detailed above, also with the prefix OP added to designate operator actions.

In a caution state, it would be recommended to improve the operator dependent performance factors by training or corrective action, as needed, and to repair or upgrade equipment, for example to add countermeasures to threats, as needed or desired, to close security gaps and achieve a higher S-SPM.

Referring again to FIG. 9, The EUT % and OP-SCM values can be combined by assigning a value within a range, for example a state or quality range of 1 to 3, 1 to 5, or 1 to 100, as described herein, to each value, and taking an average. Alternatively, a weighting can be applied to either or both values before they are combined, for example by applying a multiplier to one or both values.

The same approach can be applied in FIG. 10, where all percentages are combined and the total is divided by the number of subsystems, in this example four subsystems, to obtain an average value for EUT %. Alternatively, one or more of the values for the various subsystems can be provided with a relatively large weight, depending upon the criticality of the subsystem and the anticipated threat.

Likewise, the OP-ASC and OP-AC SC as shown in FIG. 11 can be combined by assigning a range value to each, and taking an average, or by assigning weights to either or both before averaging. As with all combinations, the values can simply be combined to produce a total value, with or without weighting applied. These total values, and/or the EUT % or S-SPM, can be compared between facilities, for example, to highlight facilities with relatively greater security problems, and they can be grouped to illustrate trends over time.

By distinguishing between equipment related and operator related problems, it is possible to more quickly identify problem areas for remediation for a given site. If the equipment fails or has downtime it also reflects a security Compliance problem for the site, and attention should be given to the selection of equipment, budgetary considerations, or the attentiveness of the maintenance department or administration, which is advantageously reflected in the overall site security Compliance.

Figure 12A:
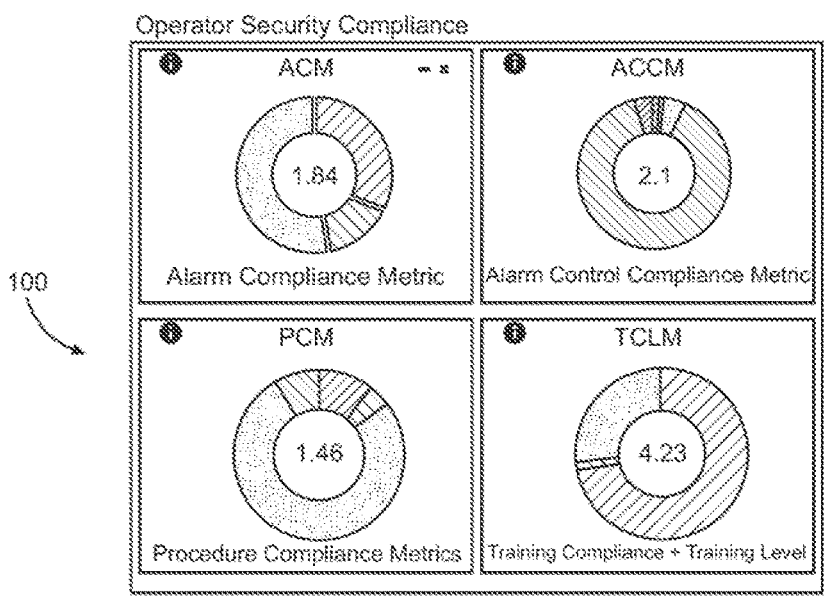
Figure 12B:
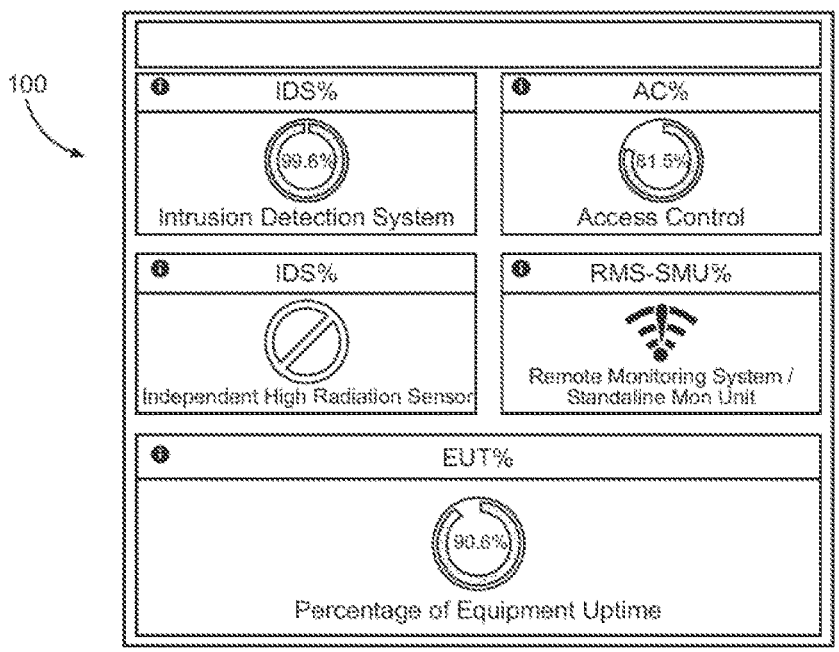
Figure 12C:
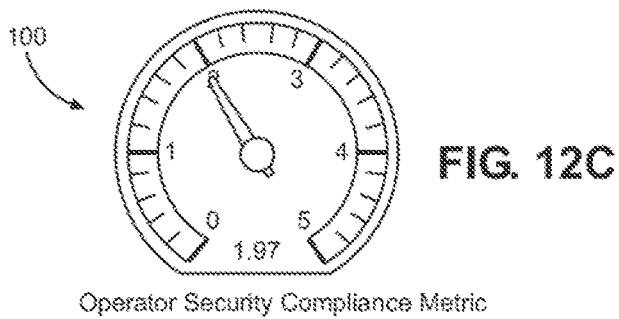
Figure 12E:
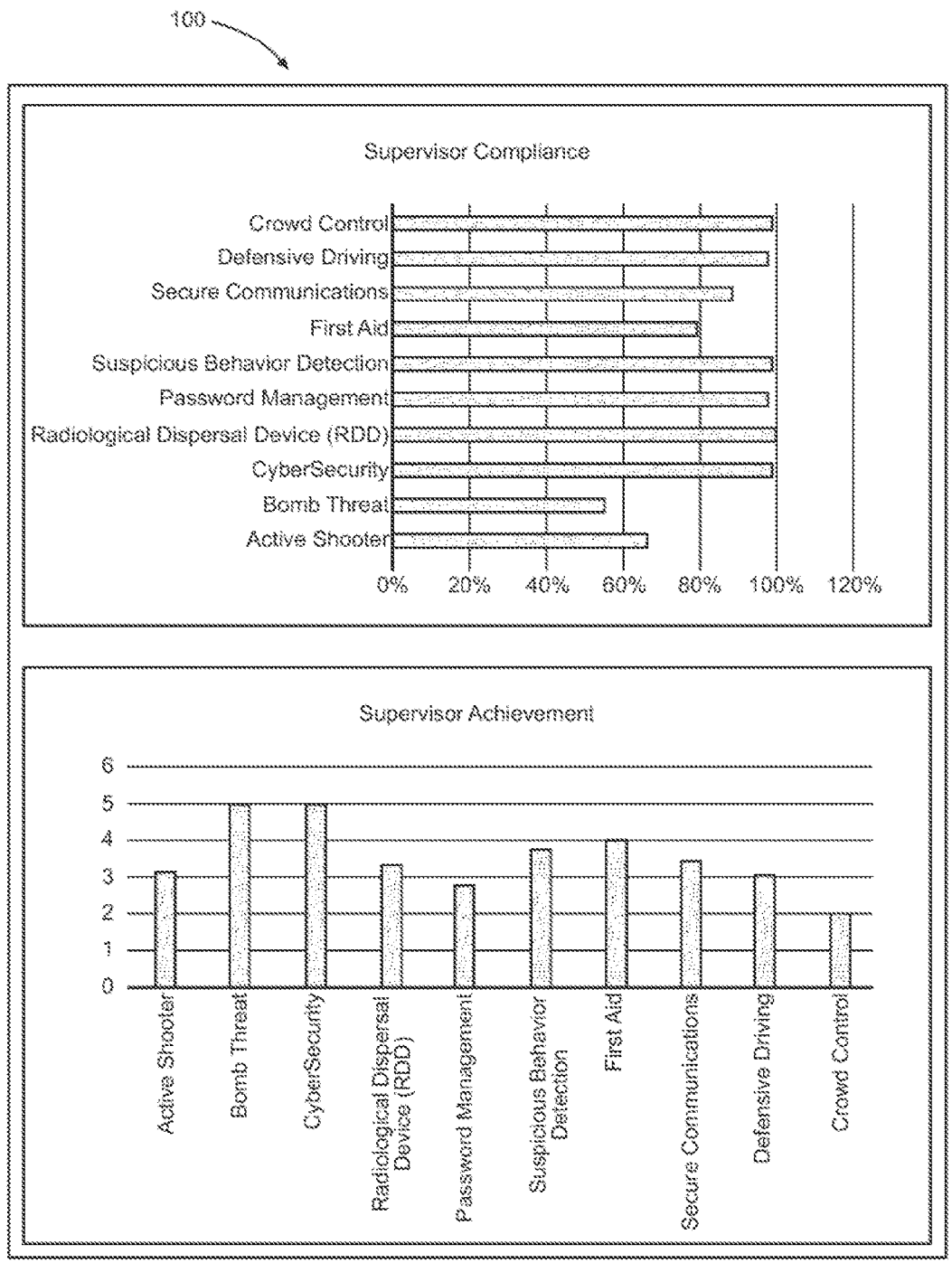
Figure 12F:
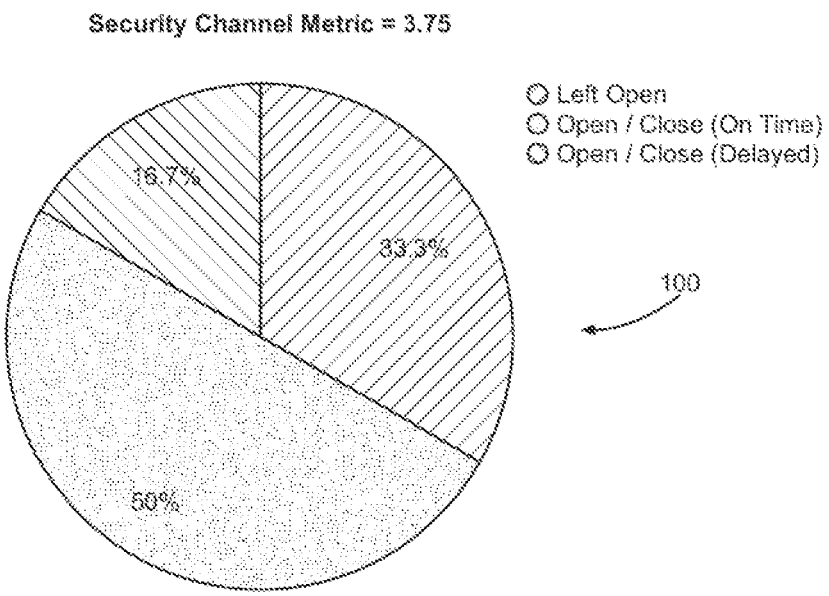
Figure 12G:
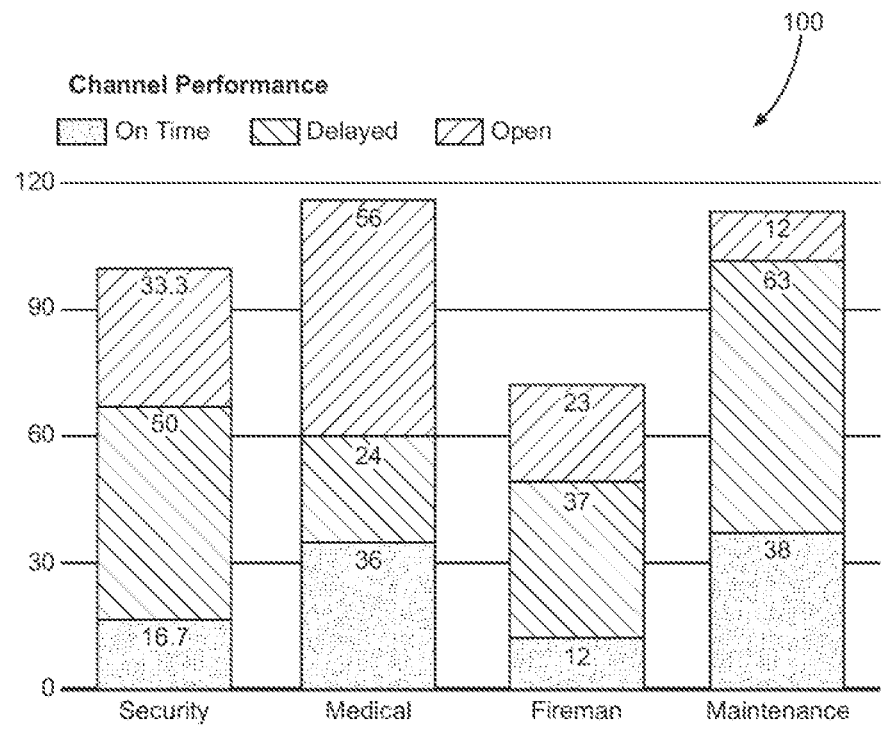

With reference to FIGS. 12A-12G, an additional or alternative user interface, or Regulator Information Dashboard (RID), of system 100 is shown. In FIG. 12A, Operator Security Compliance is summarized by four dial scales corresponding to an Alarm Compliance Metric, An Access Control Compliance Metric, Procedure Compliance Metrics, and Training Compliance and Training Level.

The dial scales are divided numerically and into colors, where values 0-3 represent varying levels of a red state, indicating non-compliance as described with respect to FIG. 4; values 3 to 4.99 represent varying levels of a yellow state, indicating a 'caution' state; and values 4.99 to 5 indicate a green state, indicating compliance with the applicable security procedure, protocol, or process. The values assigned to color state values are different than shown in FIG. 2, illustrating that the value ranges can be selected in accordance with ranges of compliance that are possible for the given system.

A blue color can be used, which is logically positioned between the yellow and green states described elsewhere herein, and which represents a 'guarded' state. An orange state can be positioned between the red and yellow states, to indicate a high risk security state. These colors indicating compliance state can also be considered to represent a vulnerability to threat, particularly where red corresponds to a severe vulnerability, orange a high vulnerability, yellow elevated, blue guarded, and green a low vulnerability.

FIG. 12B depicts data relating to Equipment Uptime, the data being incorporated into the Alarm and Access Metrics of FIG. 12A. The values for Equipment Uptime are provided numerically, the dial indicator displays the corresponding percentage, and a color is assigned in accordance with the ranges assigned as described above. An "i" button can be selected which reveals a schedule of downtime for any or all of the individual components within the various subsystems, so that appropriate remedial actions can be taken.

In FIG. 12C, the values for ACM, ACCM, PCM, and TCLM are combined to form an overall Operator Security Compliance Metric, following the same numeric and color format described above.

Example Computer System

Figure 13:
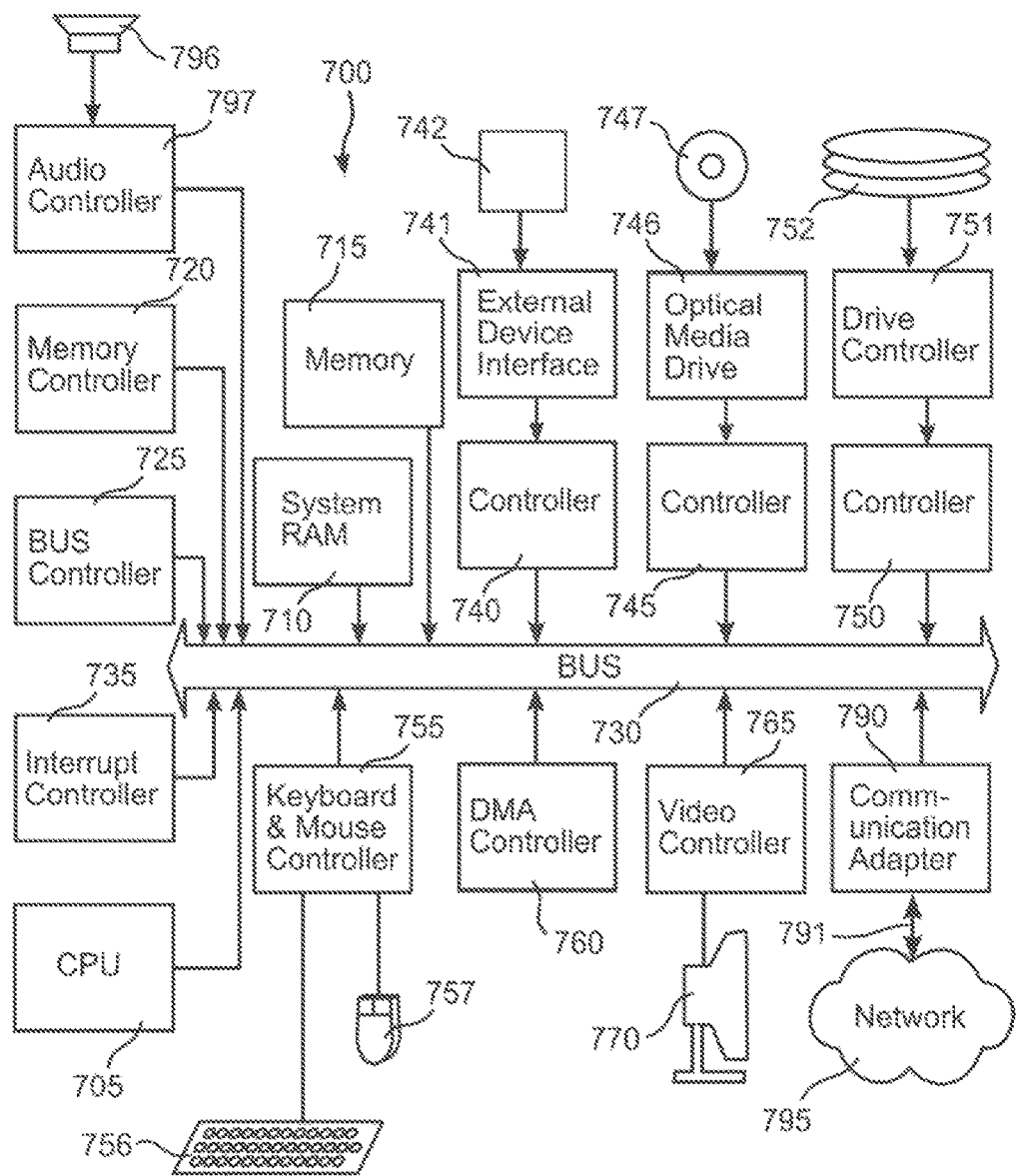
FIG. 13 is a diagram of a computer system, parts or all of which can be used to carry out the disclosure.

FIG. 13 illustrates the system architecture for a computer system 700, such as a process controller, or other processor on which or with which the disclosure may be implemented. The exemplary computer system of FIG. 13 is for descriptive purposes only. Although the description may refer to terms commonly used in describing particular computer systems, the description and concepts equally apply to other systems, including systems having architectures dissimilar to FIG. 13. Computer system 700 can control temperatures, motors, pumps, flow rates, power supplies, ultrasonic energy power generators, and valves, using actuators and transducers. One or more sensors, not shown, provide input to computer system 700, which executes software stored on non-volatile memory, the software configured to received inputs from sensors or from human interface devices, in calculations for controlling system 200.

Computer system 700 includes at least one central processing unit (CPU) 705, or server, which may be implemented with a conventional microprocessor, a random access memory (RAM) 710 for temporary storage of information, and a read only memory (ROM) 715 for permanent storage of information. A memory controller 720 is provided for controlling RAM 710.

A bus 730 interconnects the components of computer system 700. A bus controller 725 is provided for controlling bus 730. An interrupt controller 735 is used for receiving and processing various interrupt signals from the system components.

Mass storage may be provided by DVD ROM 747, or flash or rotating hard disk drive 752, for example. Data and software, including software 400 of the disclosure, may be exchanged with computer system 700 via removable media such as diskette, CD ROM, DVD, Blu Ray, or other optical media 747 connectable to an Optical Media Drive 746 and Controller 745. Alternatively, other media, including for example a media stick, for example a solid state USB drive, may be connected to an External Device Interface 741, and Controller 740. Additionally, another computing device can be connected to computer system 700 through External Device Interface 741, for example by a USB connector, BLUETOOTH connector, Infrared, or WiFi connector, although other modes of connection are known or may be hereinafter developed. A hard disk 752 is part of a fixed disk drive 751 which is connected to bus 730 by controller 750. It should be understood that other storage, peripheral, and computer processing means may be developed in the future, which may advantageously be used with the disclosure.

User input to computer system 700 may be provided by a number of devices. For example, a keyboard 756 and mouse 757 are connected to bus 730 by controller 755. An audio transducer 796, which may act as both a microphone and a speaker, is connected to bus 730 by audio controller 797, as illustrated. It will be obvious to those reasonably skilled in the art that other input devices, such as a pen and/or tablet, Personal Digital Assistant (PDA), mobile/cellular phone and other devices, may be connected to bus 730 and an appropriate controller and software, as required. DMA controller 760 is provided for performing direct memory access to RAM 710. A visual display is generated by video controller 765 which controls video display 770. Computer system 700 also includes a communications adapter 790 which allows the system to be interconnected to a local area network (LAN) or a wide area network (WAN), schematically illustrated by bus 791 and network 795.

Operation of computer system 700 is generally controlled and coordinated by operating system software, such as a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 705 coordinates the operation of the other elements of computer system 700. The present disclosure may be implemented with any number of commercially available operating systems.

One or more applications, such as an HTML page server, or a commercially available communication application, may execute under the control of the operating system, operable to convey information to a user.

Example Wireless Computing System

Figure 14:
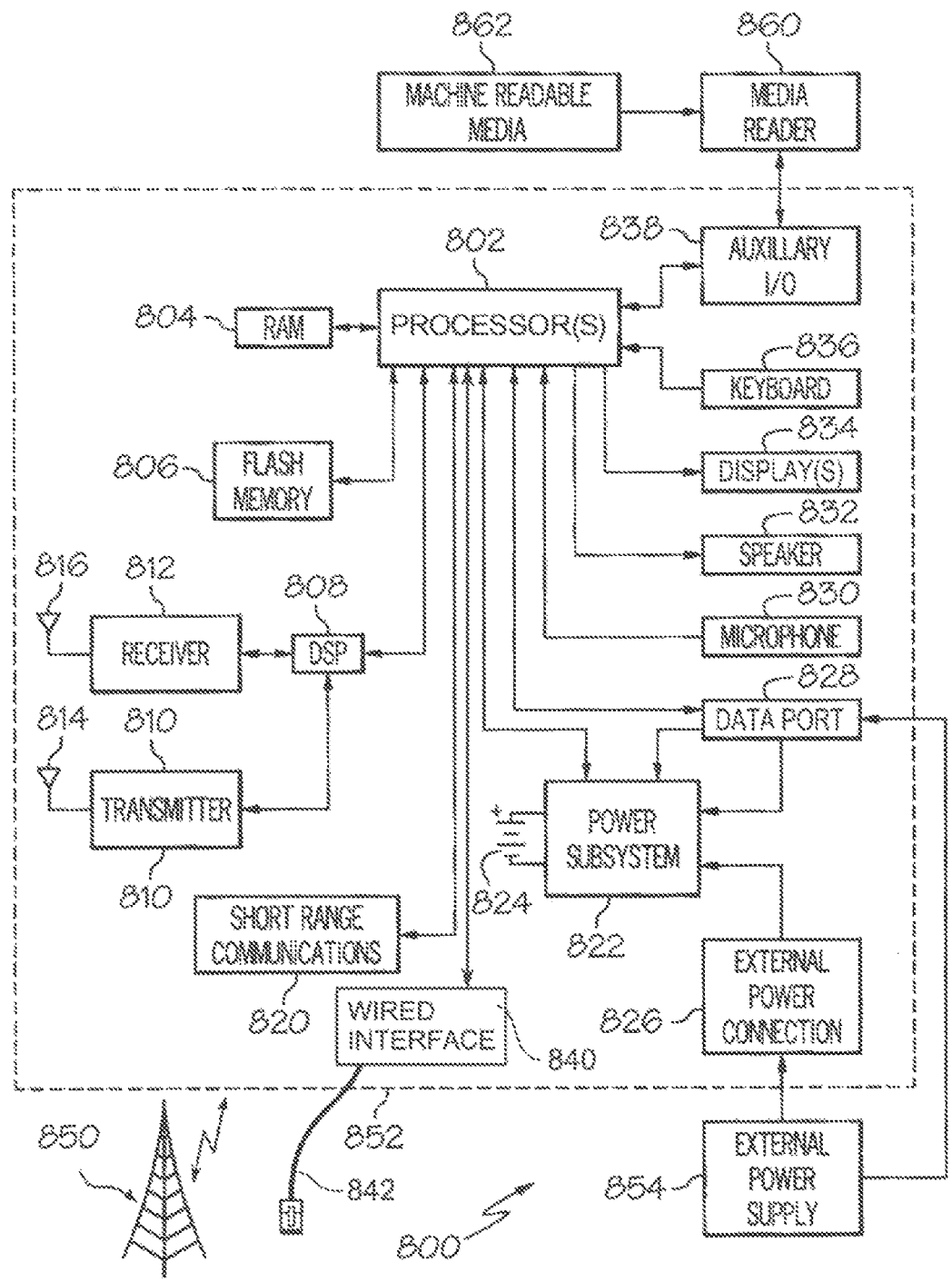
FIG. 14 is a diagram of a wireless computer system, parts or all of which can be used to carry out the disclosure.

FIG. 14, is a block diagram of an electronic device and associated components 800, which can be used in carrying out the disclosure. In this example, an electronic device 852 is a wireless two-way communication device with voice and data communication capabilities. Such electronic devices communicate with a wireless voice or data network 850 using a suitable wireless communications protocol. Wireless voice communications are performed using either an analog or digital wireless communication channel. Data communications allow the electronic device 852 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 852 is an example electronic device that includes two-way wireless communications functions. Such electronic devices incorporate communication subsystem elements such as a wireless transmitter 810, a wireless receiver 812, and associated components such as one or more antenna elements 814 and 816. A digital signal processor (DSP) 808 performs processing to extract data from received wireless signals and to generate signals to be transmitted. The particular design of the communication subsystem is dependent upon the communication network and associated wireless communications protocols with which the device is intended to operate.

The electronic device 852 includes a microprocessor 802 that controls the overall operation of the electronic device 852. The microprocessor 802 interacts with the above described communications subsystem elements and also interacts with other device subsystems such as flash memory 806, random access memory (RAM) 804, auxiliary input/output (I/O) device 838, data port 828, display 834, keyboard 836, speaker 832, microphone 830, a short-range communications subsystem 820, a power subsystem 822, and any other device subsystems.

A battery 824 is connected to a power subsystem 822 to provide power to the circuits of the electronic device 852. The power subsystem 822 includes power distribution circuitry for providing power to the electronic device 852 and also contains battery charging circuitry to manage recharging the battery 824. The power subsystem 822 includes a battery monitoring circuit that is operable to provide a status of one or more battery status indicators, such as remaining capacity, temperature, voltage, electrical current consumption, and the like, to various components of the electronic device 852.

The data port 828 of one example is a receptacle connector 104 or a connector that to which an electrical and optical data communications circuit connector 800 engages and mates, as described above. The data port 828 is able to support data communications between the electronic device 852 and other devices through various modes of data communications, such as high speed data transfers over an optical communications circuits or over electrical data communications circuits such as a USB connection incorporated into the data port 828 of some examples. Data port 828 is able to support communications with, for example, an external computer or other device.

Data communication through data port 828 enables a user to set preferences through the external device or through a software application and extends the capabilities of the device by enabling information or software exchange through direct connections between the electronic device 852 and external data sources rather then via a wireless data communication network. In addition to data communication, the data port 828 provides power to the power subsystem 822 to charge the battery 824 or to supply power to the electronic circuits, such as microprocessor 802, of the electronic device 852.

Operating system software used by the microprocessor 802 is stored in flash memory 806. Further examples are able to use a battery backed-up RAM or other non-volatile storage data elements to store operating systems, other executable programs, or both. The operating system software, device application software, or parts thereof, are able to be temporarily loaded into volatile data storage such as RAM 804. Data received via wireless communication signals or through wired communications are also able to be stored to RAM 804.

The microprocessor 802, in addition to its operating system functions, is able to execute software applications on the electronic device 852. A predetermined set of applications that control basic device operations, including at least data and voice communication applications, is able to be installed on the electronic device 852 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 852 through, for example, the wireless network 850, an auxiliary I/O device 838, Data port 828, short-range communications subsystem 820, or any combination of these interfaces. Such applications are then able to be installed by a user in the RAM 804 or a non-volatile store for execution by the microprocessor 802.

In a data communication mode, a received signal such as a text message or web page download is processed by the communication subsystem, including wireless receiver 812 and wireless transmitter 810, and communicated data is provided the microprocessor 802, which is able to further process the received data for output to the display 834, or alternatively, to an auxiliary I/O device 838 or the Data port 828. A user of the electronic device 852 may also compose data items, such as e-mail messages, using the keyboard 836, which is able to include a complete alphanumeric keyboard or a telephone-type keypad, in conjunction with the display 834 and possibly an auxiliary I/O device 838. Such composed items are then able to be transmitted over a communication network through the communication subsystem.

For voice communications, overall operation of the electronic device 852 is substantially similar, except that received signals are generally provided to a speaker 832 and signals for transmission are generally produced by a microphone 830. Alternative voice or audio I/O subsystems, such as a voice message recording subsystem, may also be implemented on the electronic device 852. Although voice or audio signal output is generally accomplished primarily through the speaker 832, the display 834 may also be used to provide an indication of the identity of a calling party, the duration of a voice call, or other voice call related information, for example.

Depending on conditions or statuses of the electronic device 852, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 820 provides for data communication between the electronic device 852 and different systems or devices, which need not necessarily be similar devices. For example, the short-range communications subsystem 820 includes an infrared device and associated circuits and components or a Radio Frequency based communication module such as one supporting Bluetooth® communications, to provide for communication with similarly-enabled systems and devices, including the data file transfer communications described above.

A media reader 860 is able to be connected to an auxiliary I/O device 838 to allow, for example, loading computer readable program code of a computer program product into the electronic device 852 for storage into flash memory 806. One example of a media reader 860 is an optical drive such as a CD/DVD drive, which may be used to store data to and read data from a computer readable medium or storage product such as computer readable storage media 862. Examples of suitable computer readable storage media include optical storage media such as a CD or DVD, magnetic media, or any other suitable data storage device. Media reader 860 is alternatively able to be connected to the electronic device through the Data port 828 or computer readable program code is alternatively able to be provided to the electronic device 852 through the wireless network 850.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A system for indicating compliance with security protocol rules, comprising:

an alarm system including one or more alarm sensors, the alarm system connected to electronic data storage for storing alarm data including a state of the alarm and a time when a state of the alarm was changed, the state including armed and disarmed, the alarm configured for transmitting a signal to a remote emergency responder in the event of an intrusion when the alarm state is armed;

an access control system including one or more access sensors, the access system connected to electronic data storage for storing access data including information pertaining to location and time of accesses to one or more secured areas;

a first electronic control circuit cooperative with the alarm system to transmit the alarm data to a remote processor;

a second electronic control circuit cooperative with the access control system to transmit the access data to a remote server;

the remote processor configured to execute software stored on non-transitory media to:

access stored data pertaining to alarm protocol rules;

access the transmitted alarm data;

access stored data pertaining to access control protocol rules;

access the transmitted access control data;

categorize the transmitted alarm data for each of a series of successive predetermined time periods according to the stored alarm protocol rules, the categories including at least two states corresponding to non-compliant and compliant with the alarm protocol rules;

categorize the transmitted access control data for each of a series of successive predetermined time periods according to the stored access protocol rules, the categories including at least two states corresponding to non-compliant and compliant with the access control protocol rules;

calculate an alarm metric value corresponding to adherence to the alarm protocol rules by applying the formula (number of compliant days*x)+(number of non-compliant days*y)/(total number of days) where x and y are each a weighting multiplier;

calculate an access metric value corresponding to adherence to the access protocol rules by applying the formula (number of compliant days*x)+(number of non-compliant days*y)/(total number of days) where x and y are each a weighting multiplier;

calculating a combined value of the alarm metric and the access metric to produce a single value indicative of overall compliance; and cause an output on a computer display of the alarm metric, the access metric, and the combined value, for evaluation of security compliance.

2. The system of claim 1, wherein the remote processor is further configured to:

when categorizing the transmitted alarm data for each of a series of successive predetermined time periods according to the stored alarm protocol rules, include a third state corresponding to possibly compliant with the alarm protocol rules;

when categorizing the transmitted access control data for each of a series of successive predetermined time periods according to the stored access protocol rules, include a third state corresponding to possibly compliant with the access control protocol rules;

when calculating the alarm metric value corresponding to adherence to the alarm protocol rules, add the third state by modifying the formula to include the third state: (number of compliant days*x)+(number of non-compliant days*y)+(number of possibly compliant days*z)/(total number of days) where x and y and z are each a weighting multiplier; and when calculating the access control metric value corresponding to adherence to the access control protocol rules, add the third state by modifying the formula to include the third state: (number of compliant days*x)+ (number of non-compliant days*y)+(number of possibly compliant days*z)/(total number of days) where x and y and z are each a weighting multiplier.

3. The system of claim 1, wherein when categorizing the transmitted alarm data for each of a series of successive predetermined time periods, time periods in which the alarm system is not recording data are not included.

4. The system of claim 1, wherein the remote processor is further configured to:
  access stored data pertaining to the security protocol rules; and
  when calculating a combined value of the alarm metric and the access metric to produce a single value indicative of overall compliance, the combined value is categorized into one of three states corresponding to compliant, possibly compliant, and non-compliant, with respect to the security protocol rules.

5. The system of claim 1, further including an uptime electronic control circuit cooperative with at least one hardware system selected from the alarm system, the access control system, and a radiation monitoring system, the uptime electronic control circuit operative to transmit a readiness state of the selected at least one hardware system.

6. The system of claim 5, wherein the transmitted readiness state is categorized and combined with the alarm metric value and the access metric value to produce a site metric value incorporating operator compliance with respect to the alarm and access systems and an equipment readiness state, to determine a state of protection for a site protected by the alarm and access control systems.

7. A method for indicating compliance with security protocol rules, comprising:
  connecting an alarm system through a network to a server, the alarm system including one or more alarm sensors, the alarm system connected to electronic data storage for storing and communicating alarm data to the server, the data including a state of the alarm and a time when a state of the alarm was changed, the state including armed and disarmed, the alarm configured for transmitting a signal to a remote emergency responder in the event of an intrusion when the alarm state is armed;
  connecting an access control system through a network to a server, the access control system including one or more access sensors, the access system connected to electronic data storage for storing and communicating access data to the server, the data including information pertaining to location and time of accesses to one or more secured areas;
  a first electronic control circuit cooperative with the alarm system to communicate the alarm data to a remote processor of the server;
  a second electronic control circuit cooperative with the access control system to communicate the access data to a remote processor of the server;
  the remote processor configured to execute software stored on non-transitory media to:
    access stored data pertaining to alarm protocol rules;
    access the transmitted alarm data;
    access stored data pertaining to access control protocol rules;
    access the transmitted access control data;
    categorize the transmitted alarm data for each of a series of successive predetermined time periods according to the stored alarm protocol rules, the categories including at least two states corresponding to non-compliant and compliant with the alarm protocol rules;
    categorize the transmitted access control data for each of a series of successive predetermined time periods according to the stored access protocol rules, the categories including at least two states corresponding to non-compliant and compliant with the access control protocol rules;
    calculate an alarm metric value corresponding to adherence to the alarm protocol rules by applying the formula (number of compliant days*x)+(number of non-compliant days*y)/(total number of days) where x and y are each a weighting multiplier;
    calculate an access metric value corresponding to adherence to the access protocol rules by applying the formula (number of compliant days*x)+(number of non-compliant days*y)/(total number of days) where x and y are each a weighting multiplier;
    calculating a combined value of the alarm metric and the access metric to produce a single value indicative of overall compliance; and
    cause an output on a computer display of the alarm metric, the access metric, and the combined value, for evaluation of security compliance.

8. The method of claim 7, wherein when categorizing the transmitted alarm data for each of a series of successive predetermined time periods, time periods in which the alarm system is not recording data are not included.

9. The method of claim 7, wherein the remote processor is further configured to:
  access stored data pertaining to the security protocol rules; and
  when calculating a combined value of the alarm metric and the access metric to produce a single value indicative of overall compliance, the combined value is categorized into one of three states corresponding to compliant, possibly compliant, and non-compliant, with respect to the security protocol rules.

10. The method of claim 7, further including using an uptime electronic control circuit cooperative with at least one hardware system selected from the alarm system, the access control system, and a radiation monitoring system, the uptime electronic control circuit operative to transmit a readiness state of the selected at least one hardware system.

11. The method of claim 10, wherein the transmitted readiness state is categorized and combined with the alarm metric value and the access metric value to produce a site metric value incorporating operator compliance with respect to the alarm and access systems and an equipment readiness state, to determine a state of protection for a site protected by the alarm and access control systems.

* * * * *